United States Patent
Janis et al.

(10) Patent No.: US 9,887,751 B2
(45) Date of Patent: Feb. 6, 2018

(54) CHANNEL QUALITY INDICATION COMPENSATION FOR KRONECKER PRECODING

(71) Applicant: Nvidia Corporation, Santa Clara, CA (US)

(72) Inventors: Pekka Janis, Helsinki (FI); Tommi Koivisto, Helsinki (FI); Kari Hamalainen, Helsinki (FI)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 15/005,602

(22) Filed: Jan. 25, 2016

(65) Prior Publication Data

US 2016/0218782 A1   Jul. 28, 2016

Related U.S. Application Data

(60) Provisional application No. 62/108,233, filed on Jan. 27, 2015.

(51) Int. Cl.
*H04B 7/02*   (2017.01)
*H04B 7/04*   (2017.01)
*H04W 16/28*  (2009.01)
*H04B 7/06*   (2006.01)

(52) U.S. Cl.
CPC ......... *H04B 7/0469* (2013.01); *H04B 7/0478* (2013.01); *H04B 7/065* (2013.01); *H04B 7/0639* (2013.01); *H04W 16/28* (2013.01)

(58) Field of Classification Search
CPC .................................................... H04B 7/0469
USPC .......................................................... 375/267
See application file for complete search history.

(56) References Cited

U.S. PATENT DOCUMENTS

| | | | |
|---|---|---|---|
| 2012/0275495 A1* | 11/2012 | Bergman | H04B 7/0652 375/219 |
| 2013/0259151 A1* | 10/2013 | Thomas | H04L 25/03949 375/267 |
| 2013/0272211 A1* | 10/2013 | Quan | H04B 7/0452 370/329 |

* cited by examiner

*Primary Examiner* — Lihong Yu

(57) ABSTRACT

A communications system has a cellular structure and the communications system includes a base station that is located within a cell of the cellular structure and employs a Kronecker product of azimuth and elevation precoding vectors for beamforming. Additionally, the communications system includes user equipment that is located within the cell and coupled to the base station to receive a reference channel state information process employing a reference precoding vector for use in a non-reference channel state information process to derive a compensated channel quality indication. A method of operating a communications system is also included.

20 Claims, 2 Drawing Sheets

CHANNEL QUALITY INDICATION COMPENSATION FOR KRONECKER PRECODING

CROSS-REFERENCE TO RELATED APPLICATION

This application claims the benefit of U.S. Provisional Application Ser. No. 62/108,233, filed by Pekka Janis, et. al. on Jan. 27, 2015, entitled "CQI Compensation For Kronecker Precoding", commonly assigned with this application and incorporated herein by reference.

TECHNICAL FIELD

This application is directed, in general, to electronic communications and, more specifically, to a communications system and a method of operating a communications system.

BACKGROUND

Currently, the base-stations (eNB) of a Long Term Evolution (LTE) network apply user equipment specific beamforming typically in the azimuth or polarization domain. At the same time, the current antenna arrays equipped at base stations consist of multiple antenna elements which are also distributed vertically into antenna columns. Recently the possibility of applying dynamic, user equipment specific beamforming using different antenna elements of each antenna column has been taken under consideration, in order to boost LTE system performance. What is needed in the art is an improved way to include elevation beamforming to address Elevation Beamforming/Full-Dimension MIMO (EB/FD-MIMO) in LTE.

SUMMARY

Embodiments of the present disclosure provide a communications system and a method of operating a communications system.

In one aspect, the communications system has a cellular structure and in one embodiment, the communications system includes a base station that is located within a cell of the cellular structure and employs a Kronecker product of azimuth and elevation precoding vectors for beamforming. Additionally, the communications system includes user equipment that is located within the cell and coupled to the base station to receive a reference channel state information process employing a reference precoding vector for use in a non-reference channel state information process to derive a compensated channel quality indication.

In another aspect, the method includes providing azimuth and elevation precoding vectors for beamforming in a base station of the communications system. The method also includes receiving, from the base station, a reference channel state information process employing a reference precoding vector for use in a non-reference channel state information process to derive a compensated channel quality indication for user equipment.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Figure 1:
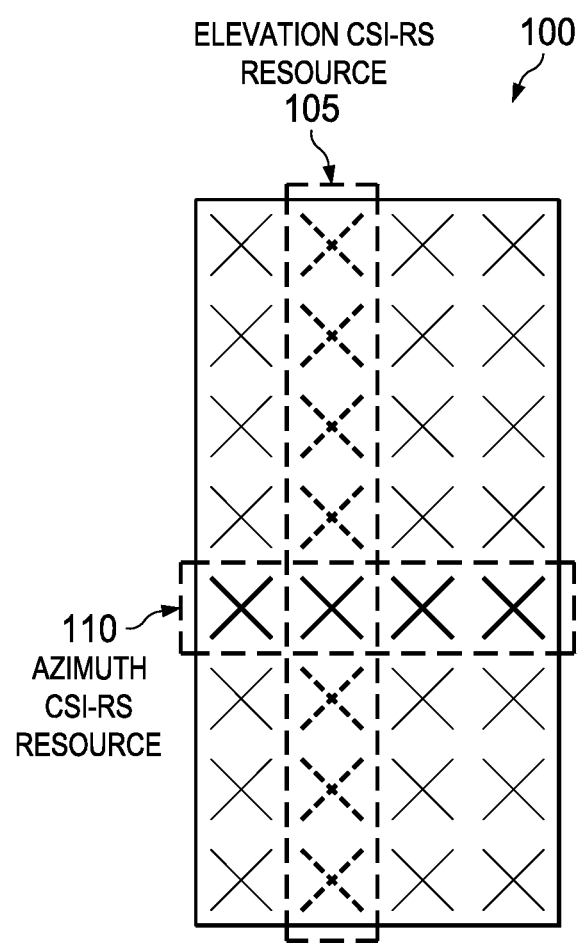
FIG. 1 illustrates column and row antenna representations for elevation and azimuth CSI-RS resources.

Cell-specific elevation beamforming corresponds to choosing a down-tilt for a base station antenna array. Consider a population of user equipment located on ground level being served by a base station whose antenna array is mounted to a mast or a roof-top. In this rather common case, it well known that the transmit beam of the base station should be down-tilted, such that the array gain is maximized for user equipment closer to the base station, while the energy radiated to or received from neighboring cell user equipment is minimized. Good down-tilt values applied jointly over the base stations maximize the signal to inter-cell interference ratio for the user equipment across communication cells.

In general, an optimal down-tilt strategy from a single base station perspective does not simply maximize the received signal level at the served user equipment but would also avoid excessive inter-cell interference for neighboring cells. Therefore, in practice, optimization of cell-specific down-tilts is part of network planning and deployment optimization tasks of network operators.

A single cell-specific down-tilt that is optimized for a user equipment distribution is not optimal from a single user equipment's perspective, however. At any given time and frequency (e.g., an LTE physical resource block (PRB)) a base station is transmitting data to a specific user equipment. When an applied down-tilt or a transmit beamformer on a physical resource block is optimized for each user equipment instead of a whole user equipment distribution, system performance improvement may be obtained.

In time division duplex (TDD) systems, where the uplink and downlink channels are reciprocal, an elevation beamformer may be selected according to channel measurements on the uplink transmissions. Such measurements may be done on the sounding reference signals (SRS) transmitted by the user equipment. However, in frequency division duplex (FDD) systems such reciprocity may not be assumed in general. Therefore, in frequency division duplex systems, user equipment needs to measure a channel from downlink reference signals (RS), and then subsequently report the channel measurement back to the base station. In an LTE environment, this spatial channel state information (CSI) feedback is based on a codebook, and the user equipment feedback contains a precoding matrix index (PMI) to the codebook.

For of up to eight transmit antennas, LTE systems include channel state information reference signals (CSI-RS). One option for supporting more than eight transmit antennas is to configure and transmit more CSI-RS antenna ports to the user equipment. However, such a straightforward solution has a drawback in that it increases the CSI-RS overhead (i.e., the number of resource elements (RE) reserved in a physical resource block for the transmission of CSI-RS, and hence is not practical for Physical Downlink Shared Channel (PDSCH) data transmission usage. Moreover, supporting a large number of transmit antenna ports typically requires a larger codebook, that is more complicated to design.

A solution to providing CSI feedback for the case of two-dimensional antenna arrays is to divide feedback into an azimuth/polarization domain channel state information (CSI), and an elevation domain CSI. In this case, a joint precoder for the two-dimensional array may be obtained as a Kronecker product of the azimuth and elevation precoders. Traditionally, the Kronecker precoding scheme works well for the case where the radio propagation channel is such that it exhibits low elevation or azimuth spread. In order to illustrate the scheme, suppose that the antenna array consists of M rows of transmit antennas, each with N antennas.

$$y = Hws + n, \quad (1)$$

where y is the received signal, H is the radio propagation channel matrix of size 1×MN, w is the precoding vector of size MN×1, s is the transmitted signal, and n is a noise term. In the case of Kronecker precoding, w is obtained as the Kronecker product of elevation and azimuth precoding vectors as $$w = w_E \otimes w_A. \quad (2)$$

In order to facilitate the selection of the elevation and azimuth precoders, a base station may configure and transmit two channel state information reference signals (CSI-RS) resources. One is transmitted for an elevation direction and another one is transmitted for a corresponding azimuth direction. The elevation CSI-RS resource may be transmitted from the antenna ports belonging to a single antenna column with a common polarization, thus comprising M antenna ports. Similarly, the azimuth CSI-RS resource may be mapped to N antenna ports that are horizontally distributed. In general, each elevation and azimuth CSI-RS is precoded with a precoding matrix that is a Kronecker product of an identity matrix and an elevation or azimuth precoding vector:

$$W_{El-CSI} = I_M \otimes w_{El-CSI},$$

$$W_{Az-CSI} = w_{Az-CSI} \otimes I_N, \quad (3)$$

where $w_{El-CSI}$ is an N×1 vector that precodes the elevation CSI-RS in the azimuth direction and $w_{Az-CSI}$ is an M×1 vector that precodes the azimuth CSI-RS in the elevation direction.

The columns of precoding matrices $w_{El-CSI}$ and $w_{Az-CSI}$ are the precoders of the elevation and azimuth CSI-RS ports. For example, in a case where N=2 and M=4, and simply mapping the elevation CSI-RS and azimuth CSI-RS to a single row (105) and single column (110) of a two-dimensional antenna array (as generally indicated in FIG. 1), allows choosing $w_{Az-CSI} = [1\ 0]^T$ and $w_{El-CSI} = [0\ 1\ 0\ 0]^T$, therefore obtaining $$W_{El-CSI} = \begin{bmatrix} 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \end{bmatrix} \text{ and } W_{Az-CSI} = \begin{bmatrix} 0 & 0 \\ 0 & 0 \\ 1 & 0 \\ 0 & 1 \\ 0 & 0 \\ 0 & 0 \\ 0 & 0 \\ 0 & 0 \end{bmatrix}. \quad (4)$$

The user equipment then selects the PMIs such that the expected throughput is maximized, which may for example, correspond to maximization of the precoded equivalent channel norm in the rank one transmission case, i.e.:

$$w_A = \arg\max_u u^H E[W_{Az-CSI}^H H^H H w_{Az-CSI}] u$$

$$w_E = \arg\max_u u^H E[W_{El-CSI}^H H^H H w_{El-CSI}] u. \quad (5)$$

The CQI definition of LTE mandates that the user equipment report the highest CQI level (combination of a spectral efficiency and a modulation order), which would give a block error rate (BLER) less than 10 percent. The BLER depends on the spectral efficiency, modulation order, and effective signal to interference and noise ratio (SINR) at the receiver. Therefore, the CQI derivation at the user equipment involves estimation of the SINR, which may be regarded as a function γ of the covariance of the equivalent channel $R_{\tilde{H}} = E[Hw(Hw)^H]$, and the covariance of the noise term $R_n = E[nn^H]$.

As per LTE standards, the two CSI-RS resources can be configured to the user equipment as two separate CSI processes. In this case, the user equipment forms PMI, RI, and CQI information for the two processes independently, and it is up to the base station to combine the two CSIs into a combined PMI, RI, and CQI to be used in PDSCH transmission and link adaptation. The drawback of such an operation is that the combination of the individual CQIs into a single combined CQI at the base station is bound to be inaccurate, since the base station does not have accurate information on the actual MIMO channel state. The only information the base station has on the MIMO channel H comes in the reported PMI and RI values.

In order to overcome the inaccuracy of a base station derived joint or combined elevation and azimuth precoded CQI, it may be considered that one of the of the CSI feedback processes (e.g., the elevation) is chosen to be a reference CSI process in terms of PMI and RI, while the CQI is then formed and reported for the other CSI process, conditioned on the reported reference PMI and RI. In this case it is up to the user equipment to combine the measurements of the two CSI-RS resources into a joint CQI.

However, a problem arises for this case in that generally the user equipment cannot estimate the statistics of the equivalent channel, in particular the $R_{\tilde{H}}$, since the user equipment cannot observe the MIMO channel coefficients as such. The only measurements the user equipment can make on the channel are through the CSI-RS resources, where the true underlying MIMO channel matrix is masked by the applied azimuth and elevation precoding weights as shown in the equations above. This indicates that a combined CQI represents a true SINR only in several special cases (e.g., when the elevation CSI process is the reference process, and no elevation precoding has been applied to the azimuth CSI-RS resources where the azimuth CSI-RS is mapped to a single row in a two dimensional antenna array).

As noted, forming the CQI for combined azimuth and elevation CSI feedback for the case of Kronecker azimuth and elevation precoding is problematic for the user equipment since it cannot observe or make measurements on the true underlying MIMO channel, but is instead limited to observing the azimuth and elevation CSI-RS resources which may be precoded and thus may reflect biased channel conditions.

Embodiments of the present disclosure provide solutions to this situation by first, signaling (from the base station to the user equipment) the applied (reference) precoding vector used in the transmission of the non-reference CSI process, and second, using the signaled precoding vector at the user equipment for deriving a compensated CQI where the precoding gain obtained by the precoding supplied by the reference CSI process is taken into account.

Additionally, embodiments of the present disclosure enable accurate channel quality indication (CQI) for closed-loop precoded transmission that utilize a Kronecker beamforming scheme, irrespective of the beamforming applied in the corresponding elevation and azimuth channel state information reference signal (CSI-RS) resources.

Figure 2:
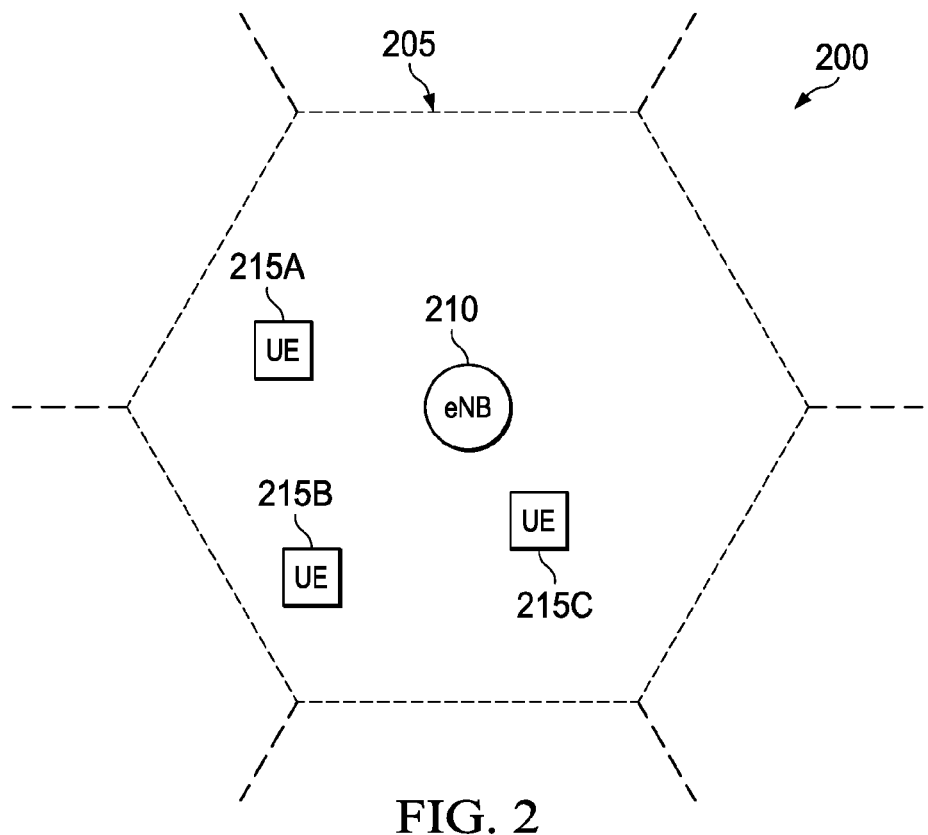
FIG. 2 illustrates a diagram of a communications system constructed according to the principles of the present disclosure.

FIG. 2 illustrates a diagram of a communications system, generally designated 200, constructed according to the principles of the present disclosure. The communications system 200 includes a communications cell 205 having a base station 210 and a population of user equipment 215A-215C. Here the base station 210 employs an antenna structure for communicating with the user equipment 215A-215C that has columns and rows as depicted in FIG. 1 above, which is generally used to provide elevation and azimuth beamforming for the user equipment 215A-215C. Additionally, each of the user equipment 215A-215C have different elevations from the base station and employ different azimuths with respect to the base station.

Each of the user equipment 215A-215C is coupled to the base station to receive a reference channel state information process employing a reference precoding vector for use in a non-reference channel state information process to derive a compensated channel quality indication.

In an exemplary case where the elevation CSI process is the reference CSI process, the base station signals the reference precoding vector $w_{Az-CSI}$ to a selected one of the user equipment 215A-215C. Then, in a first step, the selected one of the user equipment 215A-215C forms an SINR estimate for a transmission that would be precoded with a Kronecker product precoder $w = w_{Az-CSI} \otimes w_A$, (i.e., precoded in the azimuth domain using the reported PMI of the non-reference azimuth CSI process, and in the elevation domain with the elevation precoder used for the transmission of the azimuth CSI-RS resource). In a second step, the selected one of the user equipment 215A-215C estimates the elevation beamforming gain, obtained from applying the reported precoder $w_E$ on the reference elevation CSI process, instead of the precoder non-reference azimuth CSI process, $w_{Az-CSI}$.

The elevation beamforming gain denoted by G may be estimated as $$G = \frac{w_E^H E[w_{El-CSI}^H H^H H w_{El-CSI}] w_E}{w_{Az-CSI}^H E[w_{El-CSI}^H H^H H w_{El-CSI}] w_{Az-CSI}}, \quad (6)$$

where the expectation corresponds to the covariance matrix of the reference elevation CSI process, which is in practice substituted by an estimate (e.g., the sample covariance matrix).

Additionally, in a third step, the selected one of the user equipment 215A-215C may add the estimated elevation beamforming gain of the second step to the SINR estimate of the first step, derive a corresponding CQI level and transmit it back to the base station 210 along with the RI and PMI as the CSI feedback report of the non-reference CSI process.

In some embodiments, the elevation PMI may be reported in a CSI report of the non-reference CSI process separately, which entails specifying a new kind of CSI feedback mode that does not include CQI and possibly RI feedback. In some embodiments, the elevation PMI report is bundled together with the azimuth CSI report.

In yet other embodiments, the azimuth and elevation CSI-RS resources may be bundled together into a single (Kronecker) CSI-RS resource, and the elevation PMI is reported together with the azimuth PMI, combined RI, and combined CQI in a single CSI feedback report.

In order to signal the reference beamformer to the selected one of the user equipment 215A-215C, it may need to be quantized. For example, this may be accomplished by indexing a pre-defined codebook, by quantizing the phase and possibly the amplitude of the precoder coefficients, by using a parametric representation of the precoder or by quantizing the parameters of the said parametric representation.

Generally, the reference (e.g., elevation) precoder/beamformer is configurable and may be signaled to the selected one of the user equipment 215A-215C (e.g., by using RRC signaling as part of a CSI feedback configuration or as part of a CSI-RS configuration, as noted). However, in some embodiments, the reference elevation beamformer applied for the azimuth CSI-RS is not configurable, but rather fixed, which is still applicable in embodiments of the present disclosure.

Figure 3:
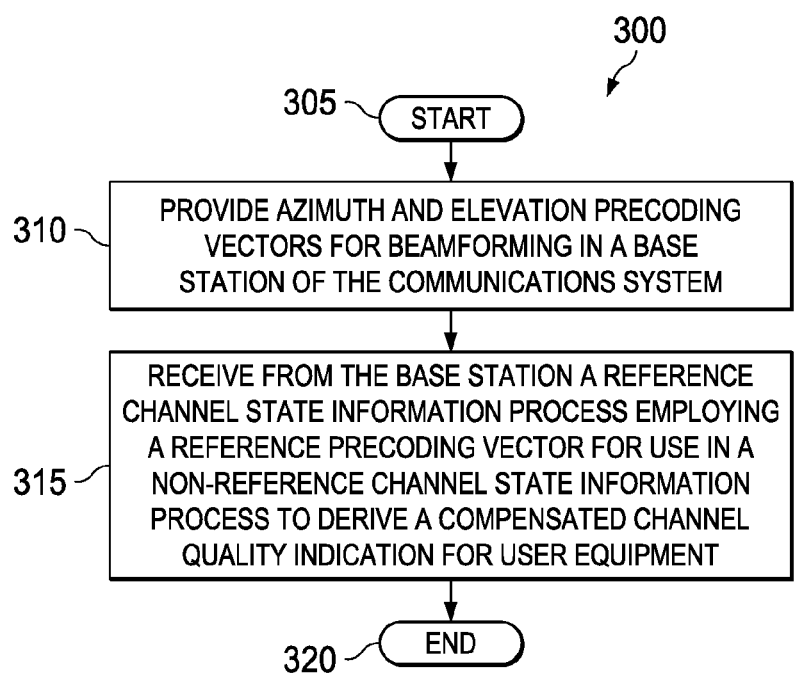
FIG. 3 illustrates a flow diagram of an embodiment of a method of operating a communications system carried out according to the principles of the present disclosure.

FIG. 3 illustrates a flow diagram of an embodiment of a method of operating a communications system, generally designated 300, carried out according to the principles of the present disclosure. The method 300 starts in a step 305 and then, azimuth and elevation precoding vectors for beamforming are provided in a base station of the communications system, in a step 310.

A reference channel state information process employing a reference precoding vector for use in a non-reference channel state information process to derive a compensated channel quality indication for user equipment is received from the base station, in step 315.

In one embodiment, the reference channel state information process corresponds to an elevation channel state information process and the non-reference channel state information process corresponds to an azimuth channel state information process. In another embodiment, the reference channel state information process corresponds to an azimuth channel state information process and the non-reference channel state information process corresponds to an elevation channel state information process.

Correspondingly, a signal-to-interference-plus-noise ratio estimate is generated using a reported precoding matrix indicator of the non-reference channel state information process. Additionally, a reference channel beamforming gain is estimated by applying the reference precoding vector to the reference channel instead of the non-reference channel.

In yet another embodiment, a non-reference channel signal-to-interference-plus-noise ratio estimate and a reference channel beamforming gain estimate are added to provide the compensated channel quality indication of the non-reference channel state information process.

In still another embodiment, a precoding matrix indicator and a rank indicator along with the compensated channel quality indication are fed back to the base station as the parts of a channel state information report for the non-reference channel state information process. In a yet further embodiment, a reference channel precoding matrix indicator is included separately in a non-reference channel state information report.

In still a further embodiment, signaling of the reference precoding vector to the user equipment employs one selected from the group consisting of a parametric representation of the reference precoding vector, quantized parameters of a parametric representation of the reference precoding vector, quantized phase or amplitude of precoder coefficients corresponding to the reference precoding vector, and an indexed, pre-defined codebook containing the reference precoding vector. Additionally, the reference precoding vector may be a fixed precoding vector and therefore not configurable. The method 300 ends in a step 320.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A communications system having a cellular structure, comprising:
   a base station that is located within a cell of the cellular structure and employs azimuth and elevation precoding vectors for beamforming; and
   user equipment, located within the cell and coupled to the base station, configured to derive a compensated channel quality indication by taking into account a reference channel beamforming gain resulting from applying a reference precoding vector in a reference channel state information process, wherein the base station signals one of the azimuth and elevation precoding vectors to the user equipment as the reference precoding vector, and the reference precoding vector is used in a non-reference channel state information process.

2. The communications system as recited in claim 1 wherein the reference channel state information process corresponds to an elevation channel state information process and the non-reference channel state information process corresponds to an azimuth channel state information process.

3. The communications system as recited in claim 1 wherein the reference channel state information process corresponds to an azimuth channel state information process and the non-reference channel state information process corresponds to an elevation channel state information process.

4. The communications system as recited in claim 1 wherein a signal-to-interference-plus-noise ratio estimate is generated using a reported precoding matrix indicator of the non-reference channel state information process.

5. The communications system as recited in claim 1 wherein the reference channel beamforming gain is estimated by applying the reference precoding vector to the reference channel state information process instead of the non-reference channel state information process.

6. The communications system as recited in claim 1 wherein a non-reference channel signal-to-interference-plus-noise ratio estimate and the reference channel beamforming gain are added to provide the compensated channel quality indication of the non-reference channel state information process.

7. The communications system as recited in claim 1 wherein a precoding matrix indicator and a rank indicator along with the compensated channel quality indication are fed back to the base station as parts of a channel state information report for the non-reference channel state information process.

8. The communications system as recited in claim 1 wherein a reference channel precoding matrix indicator is included separately in a non-reference channel state information report.

9. The communications system as recited in claim 1 wherein the reference precoding vector is selected from the group consisting of:
   a parametric representation of the reference precoding vector;
   quantized parameters of a parametric representation of the reference precoding vector;
   quantized phase or amplitude of precoder coefficients corresponding to the reference precoding vector; and
   an indexed, pre-defined codebook containing the reference precoding vector.

10. The communications system as recited in claim 1 wherein the reference precoding vector is fixed and not configurable.

11. A method of operating a communications system, comprising:
   providing azimuth and elevation precoding vectors for beamforming in a base station of the communications system; and
   deriving a compensated channel quality indication by taking into account a reference channel beamforming gain resulting from applying a reference precoding vector in a reference channel state information process, wherein the base station signals one of the azimuth and elevation precoding vectors to user equipment as the reference precoding vector, and the reference precoding vector is used in a non-reference channel state information process.

12. The method as recited in claim 11 wherein the reference channel state information process corresponds to an elevation channel state information process and the non-reference channel state information process corresponds to an azimuth channel state information process.

13. The method as recited in claim 11 wherein the reference channel state information process corresponds to an azimuth channel state information process and the non-reference channel state information process corresponds to an elevation channel state information process.

14. The method as recited in claim 11 wherein a signal-to-interference-plus-noise ratio estimate is generated using a reported precoding matrix indicator of the non-reference channel state information process.

15. The method as recited in claim 11 wherein the reference channel beamforming gain is estimated by applying the reference precoding vector to the reference channel state information process instead of the non-reference channel state information process.

16. The method as recited in claim 11 wherein a non-reference channel signal-to-interference-plus-noise ratio estimate and the reference channel beamforming gain are added to provide the compensated channel quality indication of the non-reference channel state information process.

17. The method as recited in claim 11 wherein a precoding matrix indicator and a rank indicator along with the compensated channel quality indication are fed back to the base station as parts of a channel state information report for the non-reference channel state information process.

18. The method as recited in claim 11 wherein a reference channel precoding matrix indicator is included separately in a non-reference channel state information report.

19. The method as recited in claim 11 wherein the reference precoding vector is selected from the group consisting of:
   a parametric representation of the reference precoding vector;
   quantized parameters of a parametric representation of the reference precoding vector;
   quantized phase or amplitude of precoder coefficients corresponding to the reference precoding vector; and
   an indexed, pre-defined codebook containing the reference precoding vector.

20. The method as recited in claim 11 wherein the reference precoding vector is fixed and not configurable.

* * * * *

UNITED STATES PATENT AND TRADEMARK OFFICE
CERTIFICATE OF CORRECTION

PATENT NO. : 9,887,751 B2  
APPLICATION NO. : 15/005602  
DATED : February 6, 2018  
INVENTOR(S) : Pekka Janis, Tommi Koivisto and Kari Hamalainen Page 1 of 1

It is certified that error appears in the above-identified patent and that said Letters Patent is hereby corrected as shown below:

In the Specification

In Column 4, Lines 18 thru 20, delete "
$$w_A = \arg\max_u u^H E[W_{Az\text{-}CSI}^H H^H H W_{Az\text{-}CSI}] u$$
$$w_E = \arg\max_u u^H E[W_{El\text{-}CSI}^H H^H H W_{El\text{-}CSI}] u.$$
" and insert --
$$w_A = \arg\max_u u^H E\left[W_{Az\text{-}CSI}^H H^H H W_{Az\text{-}CSI}\right] u$$
$$w_E = \arg\max_u u^H E\left[W_{El\text{-}CSI}^H H^H H W_{El\text{-}CSI}\right] u.$$
--

Signed and Sealed this  
Fourteenth Day of August, 2018

Andrei Iancu  
*Director of the United States Patent and Trademark Office*